Feb. 27, 1934.　　　A. MELDRUM　　　1,949,377

BOTTLE CAPPING MACHINE

Original Filed July 27, 1929　　12 Sheets-Sheet 1

WITNESS
J. J. Mains

INVENTOR.
A. Meldrum
BY
Denison & Thompson
ATTORNEYS.

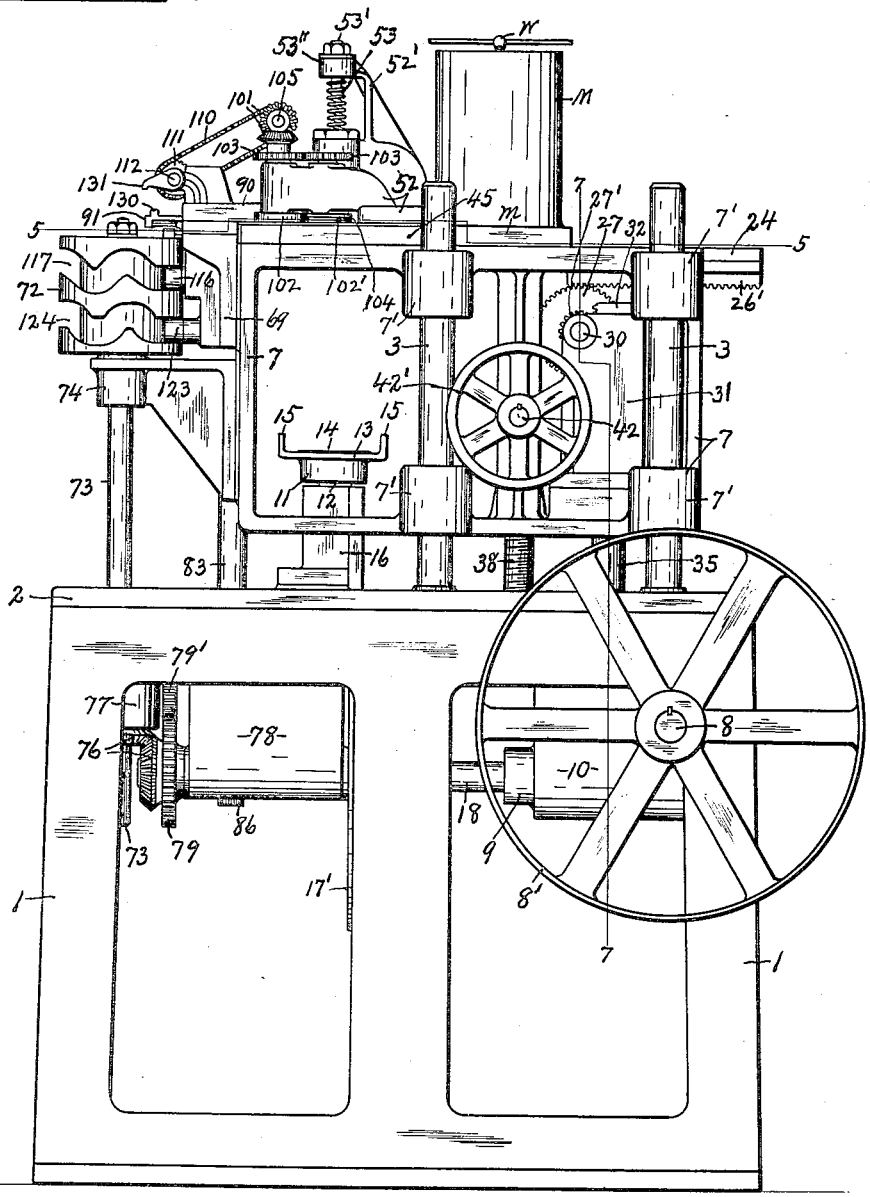

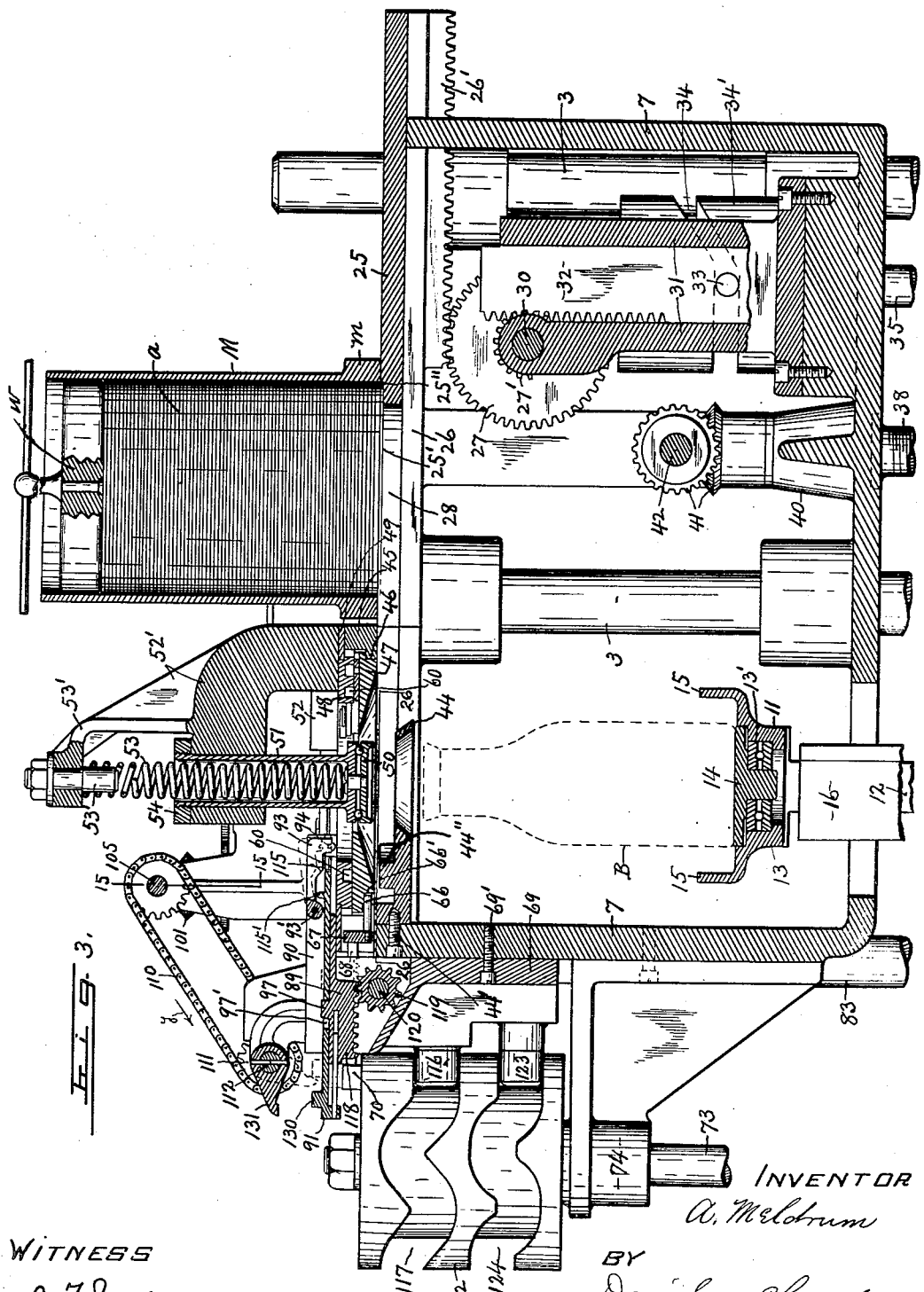

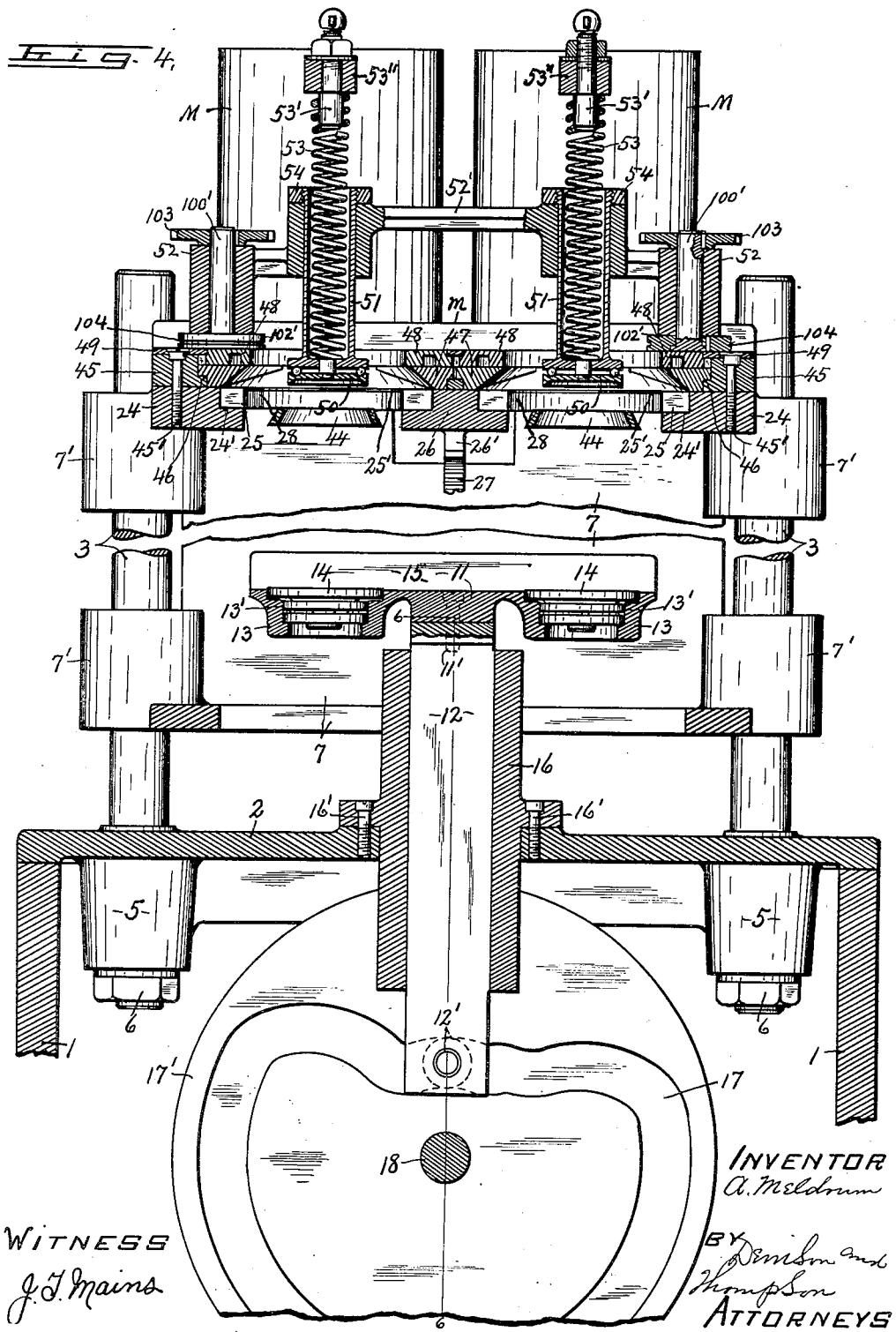

Feb. 27, 1934.  A. MELDRUM  1,949,377
BOTTLE CAPPING MACHINE
Original Filed July 27, 1929  12 Sheets-Sheet 5
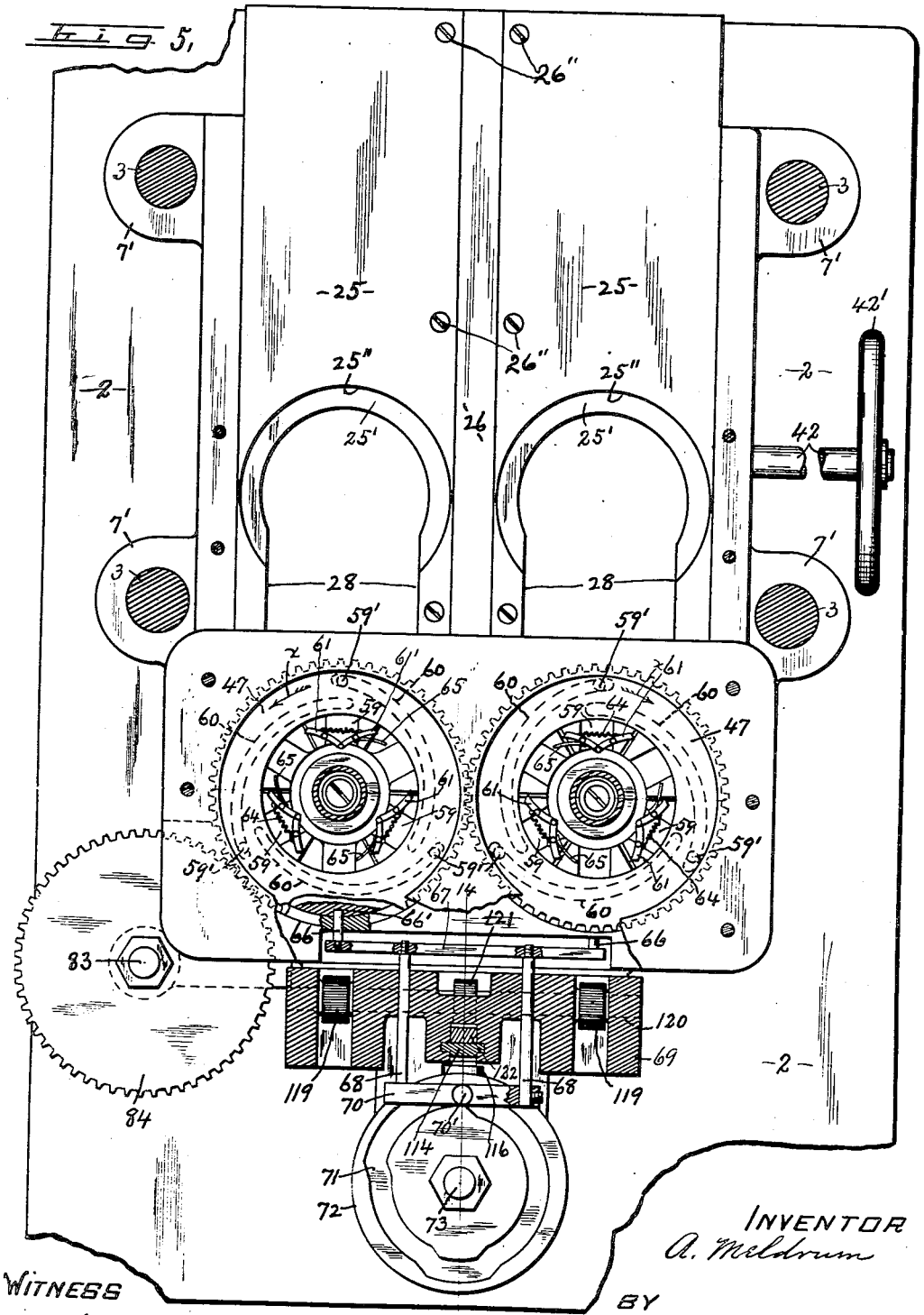

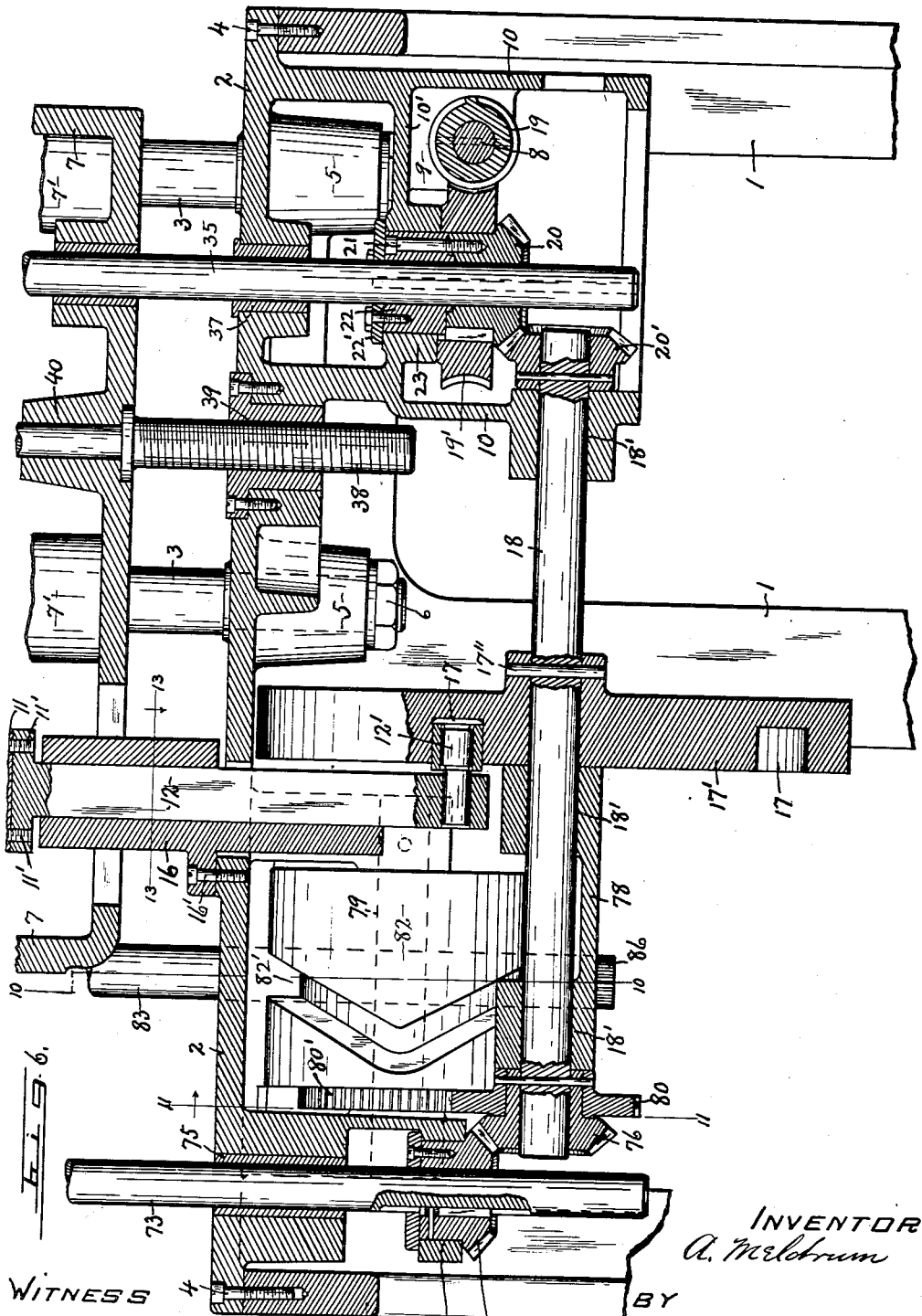

Feb. 27, 1934.  A. MELDRUM  1,949,377
BOTTLE CAPPING MACHINE
Original Filed July 27, 1929   12 Sheets-Sheet 7
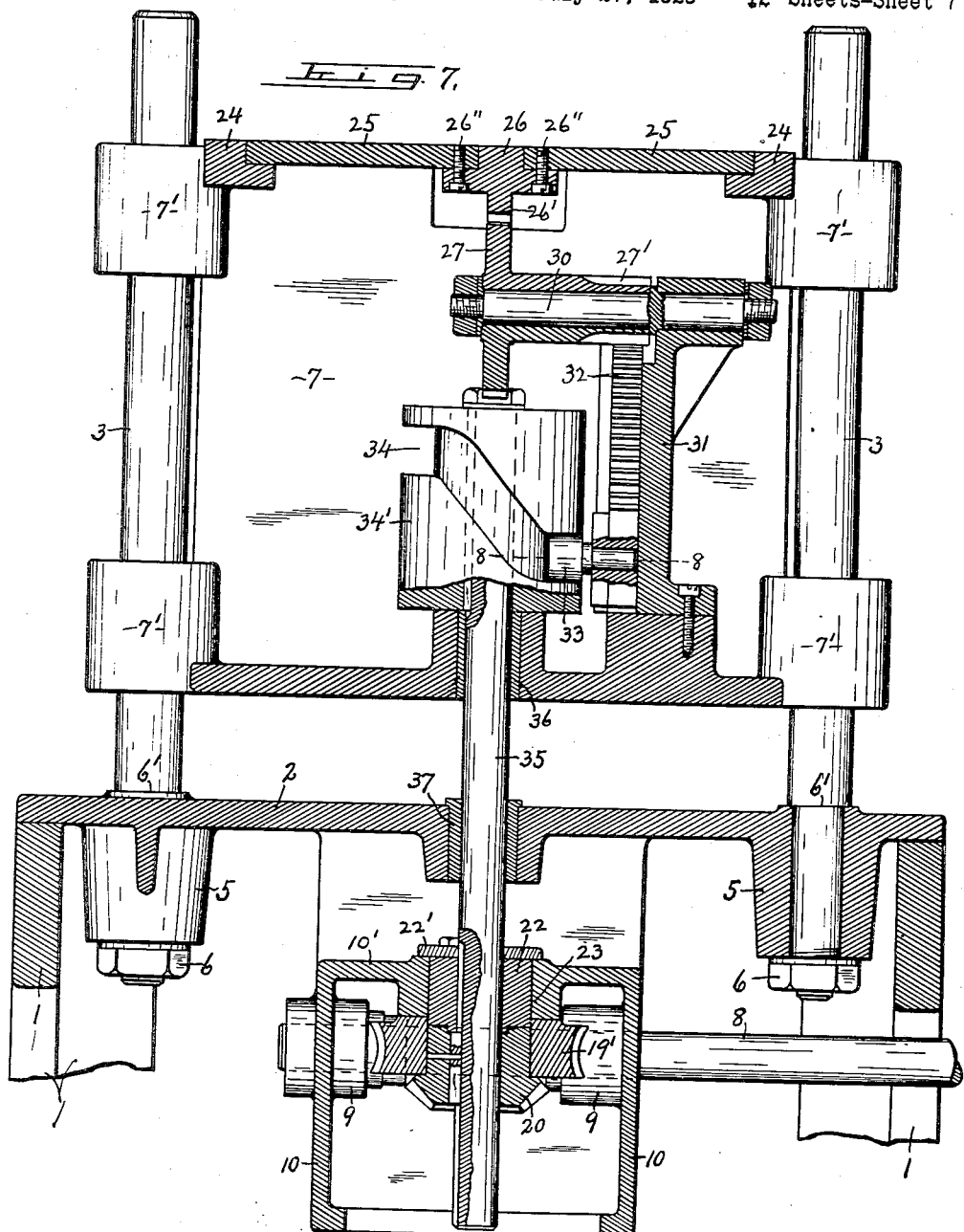
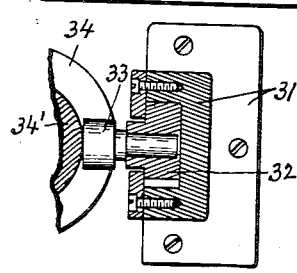
WITNESS
J. J. Mains
INVENTOR
A. Meldrum
BY
Denison & Thompson
ATTORNEYS

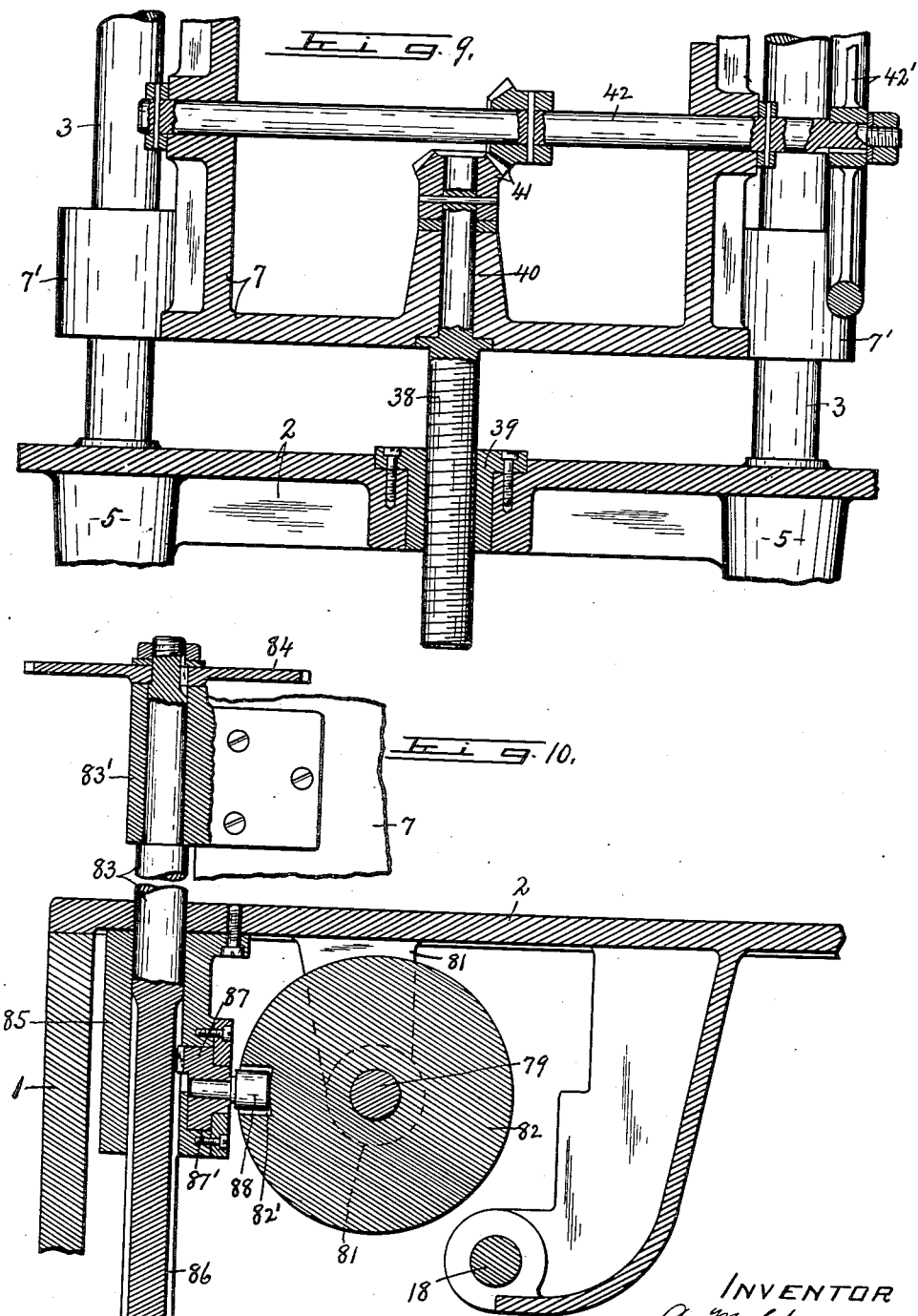

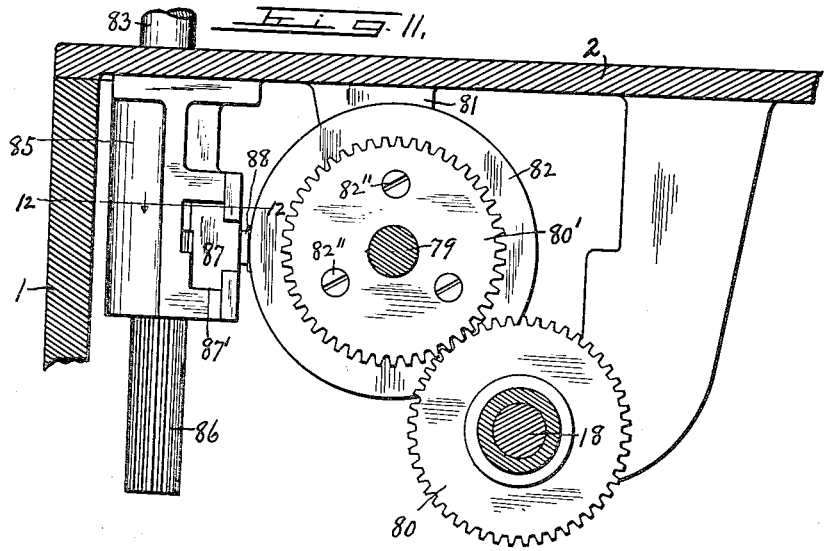
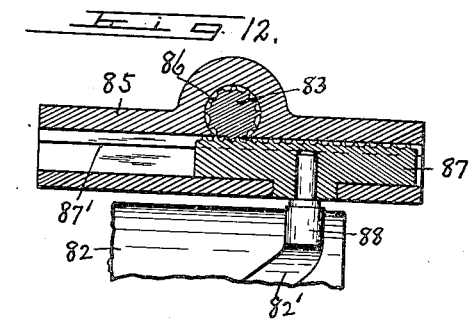
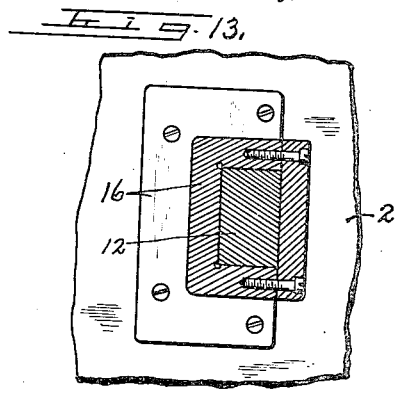

Feb. 27, 1934.   A. MELDRUM   1,949,377
BOTTLE CAPPING MACHINE
Original Filed July 27, 1929   12 Sheets-Sheet 10
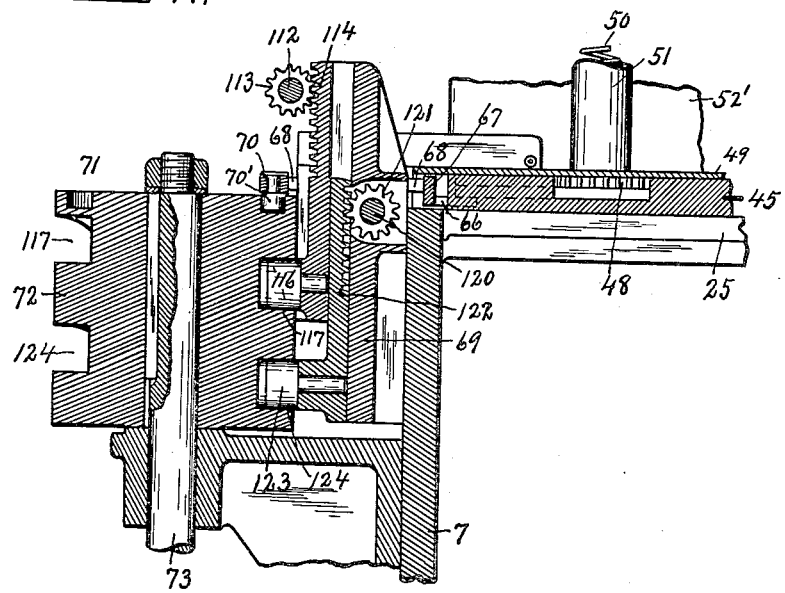
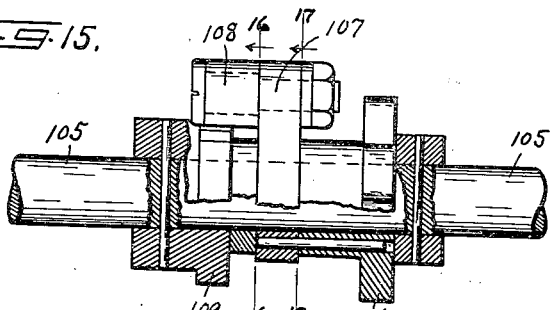
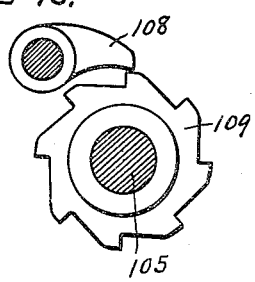
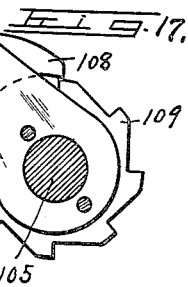
INVENTOR
A. Meldrum
BY
Denison & Thompson
ATTORNEYS
WITNESS
J. T. Mains Feb. 27, 1934.  A. MELDRUM  1,949,377
BOTTLE CAPPING MACHINE
Original Filed July 27, 1929  12 Sheets-Sheet 11
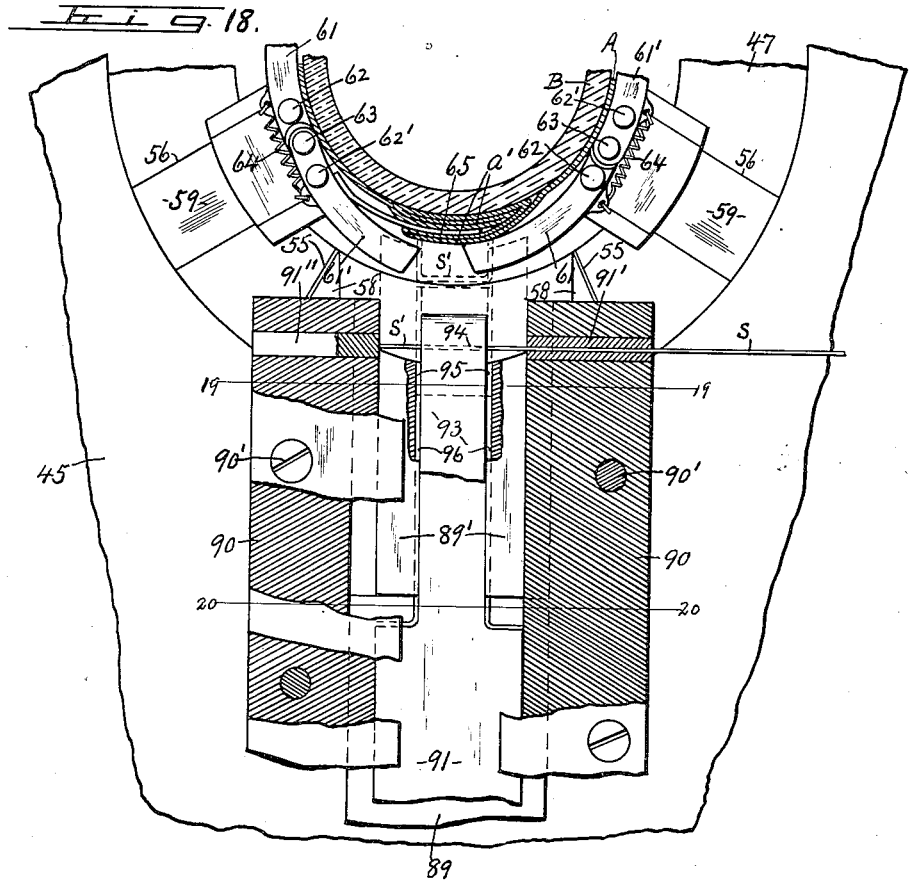
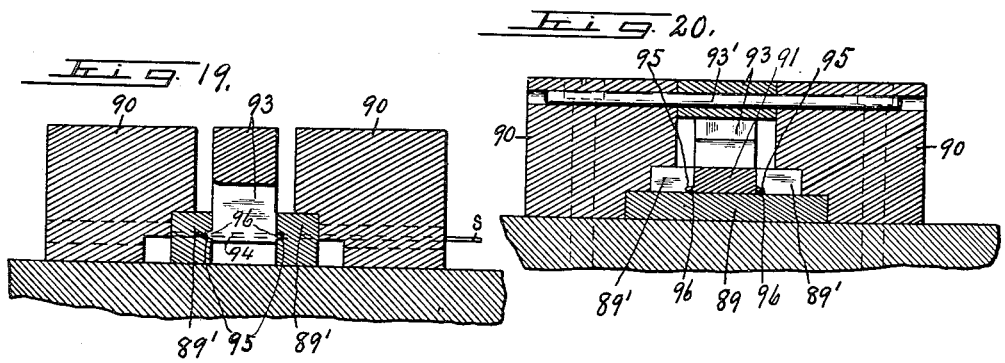
WITNESS
J. J. Mains
INVENTOR.
A. Meldrum
BY
Denison & Thompson
ATTORNEY.

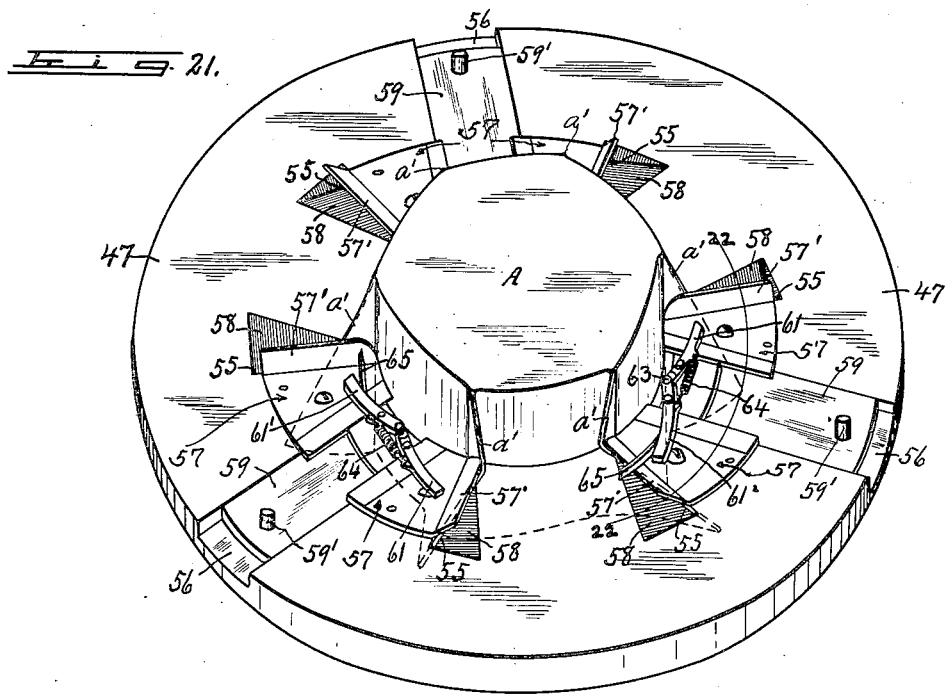
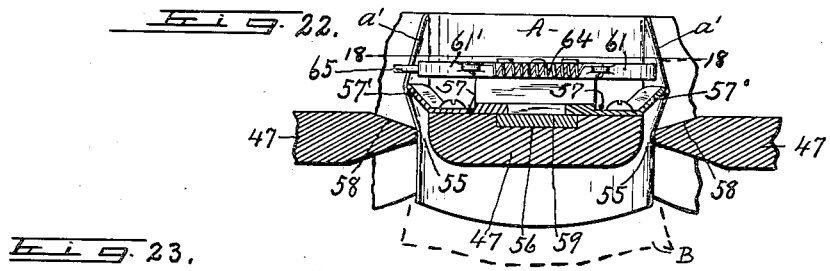
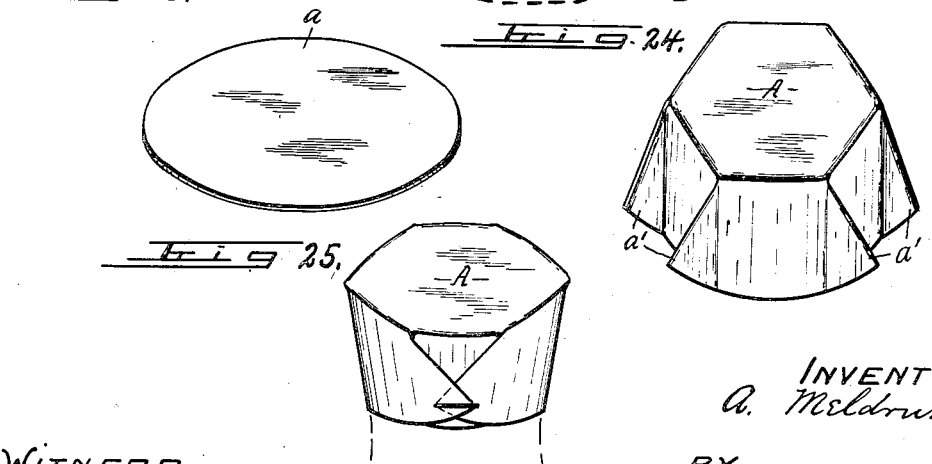

Patented Feb. 27, 1934

1,949,377

UNITED STATES PATENT OFFICE 1,949,377

BOTTLE CAPPING MACHINE

Alexander Meldrum, Syracuse, N. Y., assignor, by mesne assignments, to Smith Hood & Seal Corporation, Syracuse, N. Y., a corporation of New York Application July 27, 1929, Serial No. 381,611
Renewed February 16, 1933

39 Claims. (Cl. 226—83)

This invention relates to a machine for forming and applying paper or equivalent skirted caps over and upon the mouths and around the necks of milk bottles and analagous containers to prevent the lodgment of foreign matter within or upon the mouth of the bottle for sanitary and hygienic reasons. These skirted caps are preferably applied to bottles which have been previously filled and sealed by conventional forms of disk caps, and are tightly inserted in the mouths thereof thus forming greater or less depressions for the accumulation of dust and other foreign matter and also exposing the marginal walls of the opening to contamination by such accumulations while the application of the skirted cap in the manner hereinafter described serves to reduce to a minimum the accumulations of deleterious matter upon the wall of the opening of the bottle.

The main object of the present invention is to provide a machine for automatically and expeditiously forming and applying the skirted caps to the bottles in such manner that they will be self-retaining thereon against accidental displacement through the medium of special folds of the skirt and special sealing means for the folds capable of being easily broken by hand by the purchaser of the filled bottle and when broken prevents the reuse of the cap without detection.

Another object is to provide means whereby the bottle-supporting mechanism and capping mechanism may be relatively adjusted to permit it to be used in capping bottles of different sizes or capacities.

A further object is to provide for the simultaneous capping of a plurality of bottles in the same machine or rather to permit the use of a single bottle support adapted to carry a plurality of bottles to which the skirted caps may be simultaneously applied in practically one and the same operation.

Another object is to provide means whereby the operation of bringing the bottle supporting mechanism and the capping mechanism toward each other will automatically effect the folding of the skirt of the cap in such manner that certain parts of the folds will be brought into overlapping relation preparatory to receiving the sealing means.

Another object is to provide the machine with means for stapling the overlapping portions of the folds of the skirt to each other and to utilize the resistance of the neck of the bottle for clinching the staples as they are driven through the overlapping folds and thereby to firmly secure the skirt of the cap to the neck of the bottle.

Other objects and uses relating to specific parts of the machine will be brought out in the following description.

In the drawings:—

Figures 1 and 2 are respectively a top plan and a side elevation of a bottle capping machine embodying the various features of my invention.

Figures 3 and 4 are enlarged vertical sectional views taken respectively in the planes of lines 3—3 and 4—4, Figure 1, except that the lower portion of the frame of the machine is broken away.

Figure 5 is an enlarged horizontal sectional view taken in the plane of line 5—5, Figure 2.

Figure 6 is a detail vertical sectional view taken in the plane of line 6—6, Figure 4.

Figure 7 is an enlarged vertical sectional view taken in the plane of line 7—7, Figure 2.

Figure 8 is a detail horizontal sectional view taken in the plane of line 8—8, Figure 7.

Figure 9 is an enlarged detail vertical sectional view taken in the plane of line 9—9, Figure 1.

Figures 10 and 11 are detail vertical sectional views taken respectively in the planes of lines 10—10 and 11—11, Figure 6.

Figure 12 is a horizontal detail sectional view taken in the plane of line 12—12, Figure 11.

Figure 13 is a detail sectional view taken in the plane of line 13—13, Figure 6.

Figure 14 is a vertical detail sectional view taken in the plane of line 14—14, Figure 5.

Figure 15 is an enlarged vertical detail sectional view taken in the plane of line 15—15, Figure 3.

Figures 16 and 17 are detail sectional views taken in the planes of lines 16—16 and 17—17, Figure 15.

Figure 18 is an enlarged horizontal detail sectional view taken in the plane of line 18—18, Figure 22.

Figures 19 and 20 are detail sectional views taken respectively in the planes of lines 19—19 and 20—20, Figure 18.

Figure 21 is a perspective view of the detached skirt plaiting, plait folding and fold-clinching device.

Figure 22 is an enlarged detail sectional view taken in the arc of line 22—22, Figure 21.

Figures 23 and 24 are respectively perspective views of the circular cap blank and the plaited and partially folded cap.

Figure 25 is a perspective view of the completed cap formed upon the mouth of the bottle which is shown by dotted lines.

Figure 26:
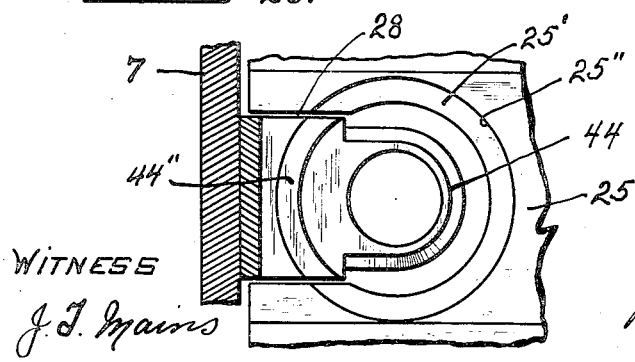

Figure 26 is a detail plan view of one of the conical bottle guide members with the corresponding disk-slide moved to the inner position in co-operative relation therewith.

The frame of the machine may be made of cast iron or any suitable material and preferably comprises a base section 1, a horizontal top section 2 and a plurality of, in this instance four, guide posts 3 extending upwardly some distance above the top plate 2 and having their lower ends rigidly secured to said top plate to hold them in vertical parallel relation for a purpose hereinafter described.

The base section 1 is preferably made of light skeleton structure for economy of manufacture and rigidity and serves primarily to support the top plate 2 in a substantially horizontal plane most convenient for the operator in the manipulation of the various controls.

Figure 1:
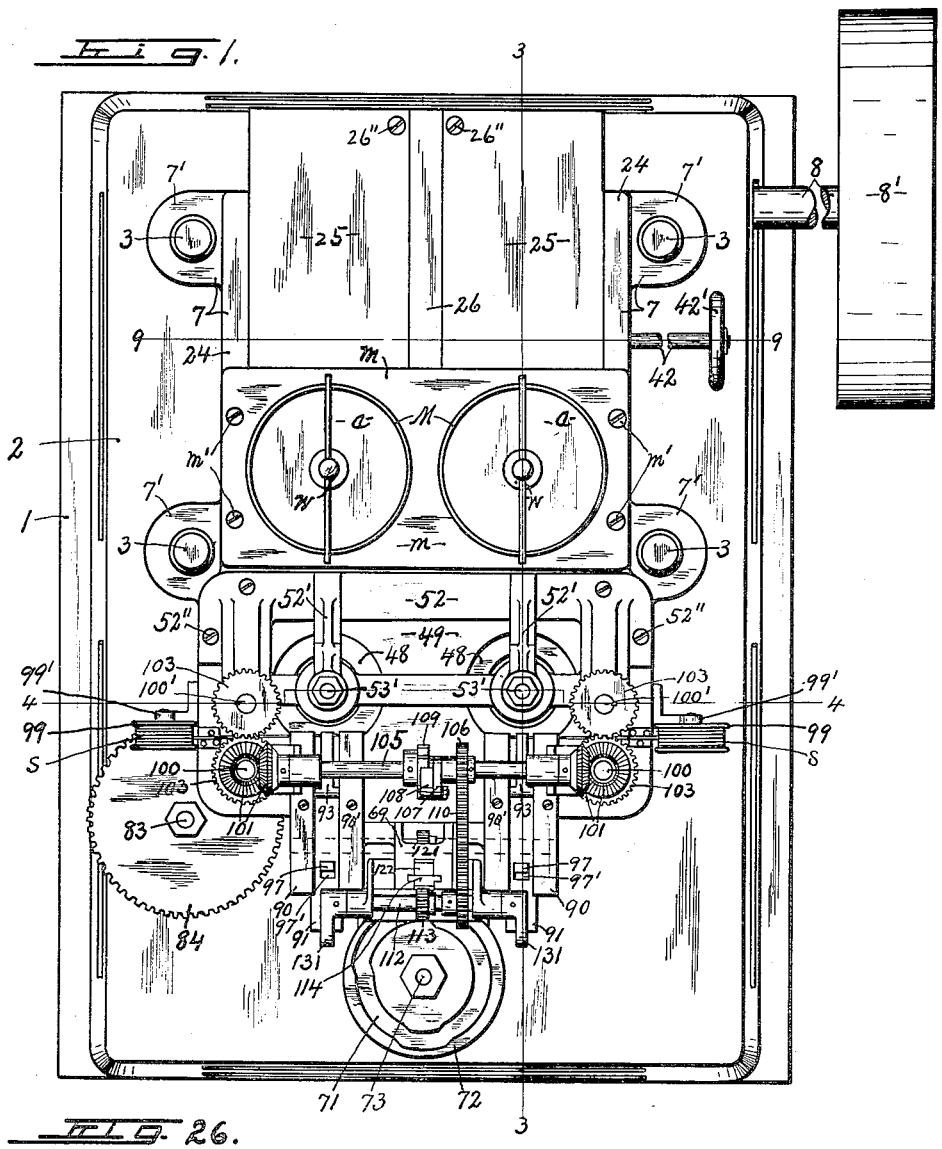

The top plate 2 is preferably made separate from the base 1 and is removably secured thereto by bolts 4, Figure 6, to add rigidity to the frame and also to serve as a means for supporting the various mechanisms used in the operation of the machine, said base 1 and top plate 2 being substantially rectangular in top plan as shown in Figure 1.

The lower ends of the upright posts 3 are reduced and extended through vertically elongated bearings or bosses 5 on the underside of the top plate 2 and firmly secured in operative position by nuts 6 which engage the lower ends of the hollow bosses 5, the reduced lower ends of said posts forming shoulders 6' for engaging the upper surface of the top plate 2 and together with the nuts 6 serve as a convenient means for firmly clamping the posts in their upright position, see Figure 7.

These posts are preferably arranged at the angles of a rectangle near one side of the machine as shown more clearly in Figure 2 for the purpose of supporting and guiding a vertically movable frame 7 hereinafter more fully described.

As previously intimated the various mechanisms employed in the operation of the machine are mounted upon or carried by the top plate 2 thus constituting a working unit which may be readily installed upon the base and secured in operative position by the screws 4, all of which clearly facilitates the assembly and inspection of the various mechanisms prior to installation on the base.

A main driving shaft 8 extends horizontally through an opening in one side of the base 1 near the rear end thereof and has its outer end provided with a pulley 8' adapted to be connected by a belt to any available source of power for rotating the driving shaft, but it is evident that any other power may be applied to said shaft for the same purpose, see Figures 1 and 2.

The inner end of the shaft 8 within the base 1 is journaled in suitable bearings 9 in the opposite end walls of a gear case 10 which, as shown more clearly in Figure 6, is secured to and preferably integral with the top plate 2 of the main supporting frame wholly within the base 1.

This machine includes in its organization a bottle-carrier mechanism in which the top of the bottle for receiving the cap, constitutes what may be termed a male die; a disk-feeding mechanism, a plaiting mechanism involving the use of one or more female dies adapted to cooperate with the male die for plaiting the skirt of the cap, a mechanism for folding the plaits into overlapping relation, and mechanism for stapling the overlapping folds to each other and to the main body of the swirt and thereby to firmly bind the skirt to the neck of the bottle.

The machine is preferably adapted to automatically cap a plurality of, in this instance two, bottles at a time and for this purpose the essential features of the mechanisms above described are duplicated in transverse alinement and the opposite sides of the frame 7 are open to permit access to the bottle carrier from either side of the machine.

*Bottle carrier mechanism*

As illustrated, Figure 4, the bottle carrier comprises a substantially horizontal head 11 which is secured by bolts 11' to the upper end of a vertically movable plunger 12 and is provided with diametrically opposite arms 13 of equal radial length having sockets 13' for receiving a pair of bottle-supporting tables 14, the latter being rotatably mounted in their respective sockets as shown more clearly in Figure 3 to permit the bottles with the plaited caps thereon to be correspondingly rotated about their axes to properly index them for the stapling operations hereinafter more fully described.

The head 14 is provided with opposite upright guide flanges 15 in transversely spaced parallel relation to guide and hold the bottles against lateral displacement from their respective tables 14.

The plunger 12 with the head 11 thereon is reciprocally movable vertically to force the tops of the bottles to and from their cap-receiving positions, said plunger being guided in its vertical movement in an upright bushing 16 which extends through an opening in the top plate 2 and is secured to said plate by bolts 16' or equivalent fastening means to form a rigid connection therewith, see Figure 6.

The lower end of the plunger 12 extends some distance below the corresponding end of the bushing 16 and is provided with a roller stud bearing 12' which engages in a cam groove 17 in one end face of a cam disk 17' as shown more clearly in Figures 4 and 6.

The cam disk 17' is secured by a key or pin 17" to a horizontal shaft 18 coaxial therewith, said shaft being journaled in suitable bearings 18' carried by the top plate 2, Figure 6.

Rotary motion is transmitted from the main driving shaft 8 to the shaft 18 through the medium of worm gears 19 and 19' and bevel gears 20 and 20' as shown more clearly in Figure 6, the said gears being located within the housing 10.

The worm gear 19' is keyed or otherwise secured to the hub of the bevel gear 20 to rotate therewith.

The hub of the bevel gear 20 is secured by bolts 21 to an upright cylindrical section 22 which is journaled in a bearing 23 forming a part of a horizontal wall 10' of the gear case 10, Fig. 6.

The worm gear 19' is engaged with the lower end of the bearing 23 to hold the section 22 and bevel gear 20 against upward movement, the upper end of the section 22 being provided with a plate 22' engaging the upper end of the bearing 23 to hold the section 22 and parts connected thereto against downward displacement, see Figure 6.

The opposite walls of the cam groove 17 are parallel and continuous and preferably heart-shaped and of sufficient throw to move the bottles from their extreme down positions below the plaiting dies as shown in Figure 3 to their extreme up position with the top of the bottle and cap blank thereon within the plaiting dies or to about the position shown in Figure 22, the cam being shaped so as to cause the bottle to move toward and from the forming dies with a gradually accelerated motion.

*Cap blank feeding mechanism*

The caps as A, Figure 25, to be formed upon the upper ends of the bottles are preferably made of circular paper disks *a* stacked one upon the other in suitable magazines M at one side of the cap-forming mechanisms and adapted to be fed from the bottoms forwardly one by one to their respective cap-plaiting mechanisms.

The magazines M and cap-plaiting mechanisms are mounted upon the frame 7 to move vertically therewith relatively to the bottle-supporting head 11 so that bottles of different heights or capacities may be capped in the same machine. The frame 7 is substantially rectangular in top plan and is provided at its four corners with hollow bosses 7' in vertically spaced relation for vertically sliding movement along and upon the upright posts 3 of the main supporting frame and at the same time holding the frame 7 against lateral displacement.

The frame 7 is provided with opposite lengthwise bars 24 arranged in parallel spaced relation and having their upper inner corners rabbeted at 24' to form lengthwise grooves for a pair of parallel lengthwise slides 25, Figure 7, the inner edges of which are secured by bolts 26" to a connecting bar 26 which serves as an actuating bar for both slides and for this purpose is provided with a pendant lengthwise rack 26' in mesh with an actuating gear 27 as shown more clearly in Figures 3 and 4.

These slides 25 are reciprocally movable horizontally to and from positions directly over the tables 14 of the bottle-supporting mechanisms and are provided with openings 28 extending outwardly from the inner ends thereof in vertical alignment with the tables 14, Figures 4 and 5.

These openings 28 are also movable into and out of registration with the lower ends of their respective magazines M as the slides 25 are reciprocated. The object of the slides 25 is to feed the lowermost blanks from the magazines M to positions directly over the upper ends of the bottles B preparatory to forming the caps upon the bottles and for this purpose the upper surface of each slide is provided with a relatively shallow recess 25' of about the thickness of one of the paper disks, Figures 4 and 5, said recesses following the outline of their respective openings 28, the outer ends of which are curved to conform to the curvature of the lower ends of the cylinders M thereby forming marginal shoulders 25" for engaging the outer edges of the paper blanks and feeding the same forwardly to the corresponding plaiting dies presently described, as the slides 25 are moved from their extreme outer positions shown in Figure 3 to their extreme inner positions with the openings 28 in registration with the upper ends of the bottles and the outer curved ends of said recesses substantially coaxial therewith.

When the slides 25 are withdrawn to their extreme outer positions the lowermost disks *a* rest upon the bottoms of the recesses 25', said disks being automatically fed downwardly by any suitable means such as weights *w* resting upon the uppermost disk, Figure 3.

The gear 27 is rotatably mounted upon one end of a stub shaft 30 having its other end secured to a bracket 31 on the bottom of the frame 7 as shown in Figure 7, said gear having its hub provided with a pinion 27' meshing with a vertically movable rack 32 which is guided in a corresponding opening in the bracket 31, Figure 3, and has its lower end provided with a roller stud 33 engaging in a cam groove 34 of a cam wheel 34', Figure 7.

The cam wheel 34' is keyed or otherwise secured to the upper end of a vertical shaft 35 which is journaled in a bearing 36 in the bottom wall of the frame 7 and extends downwardly through a guide bearing 37 in the top section 2 of the main supporting frame and also through the bevel gear 20 and cylindrical section 22, as shown in Figures 6 and 7.

The bevel gear 20 and its companion member 22 are splined on the lower end of the shaft 35 to effect the rotation thereof and also to permit the shaft to move vertically with the frame 7 for the purpose previously described.

The cam groove 34 is arranged to reciprocate the rack 32 one full stroke and return during each revolution of the cam and thereby to effect a corresponding reciprocal movement of both of the slides 25 from one extreme position to the other and return through the medium of the pinion 27', gear 27 and rack 26'.

The means for raising and lowering the frame 7 to conform to bottles of different heights comprises a screw shaft 38 having its lower end engaged in an internally threaded bushing 39 in the top section 2 of the main supporting frame 1 and its upper end journaled in a bearing 40 in the bottom wall of the frame 7 and operatively connected by bevel gears 41 to a cross shaft 42 which is journaled in suitable bearings in opposite sides of the frame 7, Figure 9, the outer end of said shaft being provided with a hand wheel 42' by which it may be rotated at will.

The lower ends of the magazines M are mounted upon a supporting plate *m* which is secured by screws or bolts *m'* to the frame 7 at the outer sides of the slides 25 as shown more clearly in Figure 1.

*Cap-forming dies*

Associated with the bottle supporting tables 14 are a pair of superposed cap-forming dies in vertical alignment therewith and in order that the upper ends of the bottles resting upon their respective tables 14 may be properly aligned with said dies I have provided a pair of upwardly tapered conical guides 44 which are secured by bolts or equivalent fastening means 44' to the adjacent upright side of the vertically movable frame 7 in a horizontal plane just above the upper end of the bottle B when the head 13 is in its extreme downward position, said guide having its upper end disposed in a horizontal plane substantially coincident with or slightly below the bottom of the recess 25" to allow the lowermost disk *a* to be fed across the top of the guide as the slides 25 are moved inwardly.

The guide member 44 is also provided with a segmental raised section 44" constructed with the same radius as the recess 25' and having substantially the same radial width with the upper surface of the raised section disposed in the same horizontal plane of the recess 25' so as to cooperate with said recess to form a continuous supporting means for the peripheral edge of the cap-disk as it is being forced by the bottle upwardly through the cap-forming dies.

A plate 45 is secured by bolts 45' to the upper surface of the top plate 24 of the frame 7 and is provided with a pair of circudar openings 46 at opposite sides of its longitudinal center for receiving a pair of similar circular rings 47 of corresponding diameter and an additional pair of gear-and-cam rings 48 coaxial with and resting flatwise upon their respective rings 47, Figs. 3 and 4.

The upper inner corners of the walls of the opening 46 are rabbeted from the top downward to receive the outer marginal edges of the rings 47 and 48, the lower outer corners of the rings 47 being reversely rabbeted to fit into the rabbets of the plate 45.

The upper outer corners of the rings 48 are also rabbeted to receive the inner edges of a retaining plate 49 which is secured to the top face of the plate 45 by the bolts 45', as shown in Figure 4.

Under this construction the rings 47 and 48 are rotatable relatively to each other and to the plate 45 and frame 7 while being held against axial movement between the plates 45 and 49.

The openings in the rings 47 and 48 are coaxial with the openings in the guide members 44 and are of sufficient diameter to permit the passage of the heads of the bottles with the caps thereon therethrough during the capping operation hereinafter described.

The lower faces of the rings 47 are disposed in horizontal planes substantially coincident with the upper surface of the lowermost disks $a$ when resting upon the bottoms of their respective recesses 25' while the upper surfaces of the guide members 44 are disposed in approximately the plane of or slightly below the bottoms of said recesses and, therefore, in slightly spaced relation to the undersides of the corresponding rings 47 to form passages for the reception of the lowermost disks as they are successively displaced from the magazines by the forward movements of the slides 25 in the manner previously explained.

It is now clear that when the lowermost disks are fed forwardly from the magazines into the spaces between the guides 44 and rings 47 the raising of the bottle supporting heads 13 will force the heads of the bottles first through the guides 44 and against the overlying disks and thence upwardly through the rings 47 and 48 for applying the caps to the mouths of the bottles and folding the skirts around the necks thereof by additional mechanism presently described.

During this upward movement of the bottles for plaiting, folding and stapling operations the portions of the caps registering with the mouths of the bottles will be pressed into engagement with alined platens 50 which are rotatably mounted upon the lower ends of upright plungers 51, Figures 3 and 4.

These plungers are guided in vertical openings in brackets 52' of a supporting plate 52 which is secured by screws or bolts 52" to the upper surface of the plate 45 as shown more clearly in Figures 1 and 3.

The plungers 51 are hollow but closed at the bottom and are normally spring-pressed downwardly by coiled springs 53 having their lower ends engaging the bottom walls of the plungers and their upper ends engaged with the stud 53' which is secured to the upper end of an extension 53" of the bracket 52', the upper ends of the plungers being provided with nuts 54 in screw threaded engagement therewith for limiting their downward movement and permitting the bottom member 50 to be positioned just above the plane of travel of the incoming disks $a$.

The object in rotatably mounting the platens 50 on the lower ends of the plungers 51 is to permit them to engage and hold the cap on the mouth of the bottle in a substantially horizontal plane and also to allow the bottles to be rotated about their axes or with their respective tables 14 for stapling the folded edges of the plaits in a manner hereinafter described.

Skirt plaiting mechanism

It will be remembered that the blanks $a$ are fed between the lower faces of the rings 47 and upper faces of the guide members 44 in a substantially flat plane before the bottle supporting members 14 with the bottles thereon are elevated and in order that the skirts of the caps may be properly folded around the neck of the bottle while closing the mouths thereof by the elevation of the bottles against the platens 50 suitable means is provided for deflecting the skirts downwardly and for plaiting the same so that the lower portions of the skirts may be impinged tightly against the neck of the bottle.

For this purpose the lower faces of the walls of the opening in the rings 47 are beveled upwardly and inwardly to reduce resistance to the upward movement of the bottle with the cap thereon and at the same time to deflect the skirts of the caps downwardly around the mouth and neck of the bottle.

The plaiting of the skirt is accomplished by providing each ring 47 with a plurality of, in this instance six, substantially radial slots 55 extending outwardly from the central opening therein and preferably arranged in pairs in equally spaced relation circumferentially around said central opening, see Figures 21 and 22.

The ring 47 is provided with a plurality of, in this instance three, radial guide grooves 56 in the upper face thereof and arranged in uniformly spaced relation circumferentially, the plait-receiving slots 55 of each pair being relatively narrow circumferentially and arranged at opposite sides of the guide grooves 56 equal distances therefrom as shown more clearly in Figure 21.

It will now be observed that when each bottle B is elevated by the upward movement of its supporting head 13 the central portion of the circular cap blank will be impinged between the upper end of the bottle and the underside of the corresponding platen 50 and that as the bottle with the platen cap blank thereon continues its upward movement against the action of the spring 53 the central portion of the blank will be held flatwise against the top of the bottle while the skirt of the cap will be deflected downwardly by the inclined lower faces of the ring 47, and the portions of the skirt registering with the slots 55 will be drawn through said slots to form the plaits as $a'$, the upward movement of the bottle being continued until the plaits are finished to the lower edge of the skirt under which conditions the lower ends of the plaits will be somewhat wider radially than at the top and in fact sufficiently wide to fold one upon the other in overlapping relation when pressed against the neck of the bottle as hereinafter described.

It will be evident from the foregoing description that during this plaiting operation the cap will be formed with a plurality of, in this instance six, plaits arranged in uniformly spaced relation circumferentially but as the plaits of each pair are formed they are simultaneously deflected circumferentially away from each other by deflecting plates 57, Figures 21 and 22.

These plates 57 are secured to the upper surface of the ring 47 at opposite sides of each of the guide grooves 56 to extend circumferentially in opposite directions therefrom to the openings 55 where they are provided with deflecting plates 57' for the purpose previously mentioned, the upper outer corners of the walls of the slots 55 of each pair being beveled at 58 to facilitate the lateral deflection of the plaits $a'$, see Figures 21 and 22.

The object of deflecting the plaits $a'$ laterally as they are formed upon the skirt of the cap is to permit the application of the folding device thereto for folding their lower ends into overlapping relation against the intervening portions of the skirt and around the neck of the bottle preparatory to stapling the overlapping portions one to the other.

Plait folding mechanism

A plurality of, in this instance three, slides 59 Figure 21, are movable radially in the guide grooves 56 of each ring 47 and are provided near their outer ends with upwardly projecting studs 59' which are engaged in separate eccentric cam grooves 60 in the lower side of the gear ring 48, as shown by full lines in Figures 3 and 4 and by dotted lines in Figure 5, said cam grooves being similarly eccentric to the axis of the ring 48 one for each of the pins or studs 59' whereby the rotation of the gear rings in the directions indicated by arrows $x$, Fig. 5, will cause the slides 59 to be moved inwardly toward the periphery of the neck of the bottle and against the adjacent portions of the skirt which then surrounds the neck.

The vertical movement of the bottle supports 13 from their normal down positions is just sufficient to bring the lower overlapping portions of the plaits of the skirt into the horizontal plane of movement of the slides 59 at which time the slides are moved inwardly to effect the folding of each pair of plaits circumferentially into overlapping relation against the portions of the skirt between the several pairs of plaits.

For this latter purpose each sliding plate 59 carries near its inner end a pair of levers 61 and 61' pivoted at 62 and 62' to said slide and extending in opposite directions circumferentially from their respective pivots, the inner ends of the levers being loosely pivoted to each other to form a toggle connection between them, see Figure 18.

These levers are yieldingly connected across the toggle pivot 63 and beyond the pivots 62 and 62' by a coiled spring 64 which serves to retract the levers from their pressing positions when the slides 59 are withdrawn.

The purpose of these levers 61 and 61' is to engage the adjacent plaits $a'$ of the bottle cap and to fold them in opposite directions against the adjacent portions of the cap and neck of the bottle. This folding of the plaits is accomplished in the following manner: As the slides 59 are being moved inwardly the inner ends of the levers 61 and 61' being normally held in advance of the pivots 62 and 62' by the spring 64, will first engage the adjacent portion of the skirt of the cap substantially midway between the adjoining plaits and then press this portion of the cap against the neck of the bottle. The inner ends of the levers will thus be maintained against further inward movement by the bottle which will cause said levers to rock about their respective pivots 62 and 62' as the slides continue their inward movement thereby causing the outer ends of the levers to swing inwardly to fold the plaits in overlapping relation.

In order to effect this overlapping relation one of the levers as 61 is provided on its inner side with a light flat spring 65 normally deflected inwardly therefrom so as to engage and press the corresponding previously deflected plait inwardly in advance of the one engaged by the other lever 61, as shown more clearly in Figure 18.

Under these conditions the lever 61 of the next adjacent slide 59 will have pressed its corresponding plait against the outer face of the adjacent end of the spring 65 as shown more clearly in Figures 18, 21 and 22, the deflecting plates 57 being extended inwardly over the adjacent edges of the corresponding slides 59 to hold the latter against upward displacement.

The length of each of the cam grooves 60 is approximately equal to one-third of the circumference of the corresponding rings 48 in which they are formed and the eccentricity of each cam is such that when the rings 48 are rotated from their normal positions in the direction indicated by arrow $x$, Figure 5, through arcs equal to the length of the cams the slides 59 carrying the folding levers 61 and 61' will be moved from their extreme outer positions to their extreme inner folding positions for effecting the folding of the overlapping plaits against the adjacent lower portions of the skirts of the caps and simultaneously pressing said skirts against the necks of the bottles.

In order that both rings 48 may be rotated in unison they are provided with peripheral gear teeth meshing with each other as shown more clearly in Figures 4 and 5.

Immediately preceding and during the operation of the slides 59 to their plait folding positions the rings 47 will be locked against rotation by movable locking pins 66 entering corresponding sockets 66' in the peripheries of said rings as shown in Figures 3 and 5, said locking pins being mounted on opposite ends of a horizontal cross bar 67 carried by a pair of reciprocally movable supporting rods 68 which are guided in suitable openings in a bracket 69 on the vertically movable frame 7 and are secured at their outer ends to a cross head 70 as shown more clearly in Figure 5, said bracket 69 being secured by bolts 69' to the frame 7 as shown in Figure 3.

The cross head 70 is provided midway between the rods 68 with a roller stud 70' which engages in a cam 71 in the upper end of an upright cam wheel 72, as shown more clearly in Figures 1, 5 and 14, said cam being constructed and arranged to move the locking pins 66 into and out of locking engagement with the corresponding rings 47 in properly timed relation to the plait-folding and stapling mechanisms.

This cam wheel 72 is secured to the upper end of a vertical shaft 73 which is journaled in a bearing 74 on the vertically movable frame 7 and has its lower end extended downwardly through a vertical guide bearing 75 in the top section 2 of the base 1 so as to slide in said bearing as the frame 7 is moved vertically as shown in Figures 2, 3 and 6.

The lower end of the shaft 73 below the bearing 75 is connected by bevel gears 76 to the adjacent end of the horizontal shaft 18, as shown in Figure 6, the bevel gear on the vertical shaft 73 being splined thereon and rotatably mounted in a bearing 77 on the underside of the top section 2 of the base 1, Figure 6.

It is now evident that rotary motion is transmitted from the horizontal shaft 18 to the upright shaft 73 which, in turn, rotates the cam 72 for moving the locking pins 66 into and out of locking engagement with their respective rings 47 thereby locking said rings against rotation during the relative rotation of the cam rings 48 in a manner presently described.

The portion of the shaft 18 between the cam 17' and bevel gear 76 on said shaft is journaled in the lower end of a bracket 78 depending from the underside of the top section 2 of the base 1.

Rotary motion is transmitted from the shaft 18 to a relatively short horizontal shaft 79 through the medium of spur gears 80 and 80', the gear 80 being preferably mounted upon the hub of the adjacent bevel gear 76 and keyed or otherwise secured to the shaft 18, as shown more clearly in Figures 6 and 11.

The shaft 79 is journaled in suitable bearings 81 depending from the underside of the top section 2 of the base 1 and carries a cam wheel 82 having a peripheral cam groove 82', the spur gear 80' being secured to the outer end face of the cam wheel 82 by screws 82'' or equivalent fastening means, see Figures 6 and 11, to rotate therewith.

Means is provided for transmitting rotary motion from the cam groove 82' of the cam wheel 82 to the cam rings 48, said means consisting of, in this instance, an upright shaft 83 extending through an opening in the top section 2 of the base 1 and having its upper end journaled in a bracket 83' on the vertically movable carriage and provided with a spur gear 84 meshing with one of the cam rings 48 as shown in Figures 5 and 10.

The lower end of the upright shaft 83 is journaled and slidable vertically in a bearing 85 on the underside of the top section 2 of the base 1 and is provided with a vertically elongated pinion 86 adapted to be engaged by a sliding rack 87, said rack being slidable laterally or transversely of the pinion 86 in a suitable guideway 87' on the bearing member 85, as shown in Figure 10.

The sliding rack 87 is provided with a roller stud 88 engaging in the cam groove 82' of the cam wheel 82 whereby the rotation of the cam wheel will effect a reciprocal movement of the rack 87 for rotating the shaft 83 in reverse directions and also effecting a reverse rotary motion of the cam rings 48 which, in turn, produces the desired operation of the plait-folding devices to and from their folding positions in the manner previously described.

The object in elongating the pinion 86 is to permit vertical movement of the shaft 83 relatively to the rack 87 without breaking connection therewith as the frame 7 carrying the shaft 83 is moved vertically to accommodate bottles of different heights.

As previously stated, the cams 71 on the shaft 73 are arranged and timed to effect the locking of the die rings 47 while the cam rings 48 are being operated to produce the necessary folding of the plaits of the cap skirt into overlapping relation firmly against the necks of the bottles so that each cap will have, in this instance three, overlapping folds arranged in uniformly spaced relation circumferentially.

That is, the plait folding slides 59 are moved to their folding positions during the angular movement of the corresponding cam rings 47 through arcs equal to the lengths of the cam slots 60 and when the inner ends of said slots approach the pins 59' the further angular movement of the rings 47 will be temporarily suspended due to the peculiar shape of the cam 82 and during this suspension one of the folds of each cap will be stapled by a suitable mechanism, presently described.

*Stapling mechanism*

I preferably provide two stapling devices one for each bottle cap except that both are operated simultaneously from one driving unit.

Each stapling device is mounted upon the vertically movable frame 7 in radial alinement with one pair of the previously folded plaits to extend outwardly therefrom radial to the rings 47 and 48 and, therefore, radial to the neck of the bottle B, as shown more clearly in Figure 18, and comprises a horizontal slide 89 movable radially of the rings 47 and 48 along suitable guides 90 and in a plane just above the upper face of the ring 48, and therefore, slightly above the plane of movement of the plait-folding devices, previously described, said guides being secured by bolts 90' or equivalent fastening means to the upper portion of the frame 7 to move vertically therewith.

Each slide 89 is provided with a pair of raised lengthwise ribs 89' in transversely spaced relation corresponding approximately to the width of the staple to be formed for receiving and guiding a staple clinching slide 91 which has a limited reciprocatory movement lengthwise of and upon the slide 89.

The outermost guide member 90 for the corresponding slide 89 is provided near its inner end with a transverse opening in which is tightly fitted a tubular guide 91' of hardened steel or equivalent material adapted to receive the wire as $s$ from which the staples for clinching the folded plaits are to be formed.

The opposite guide member 90 for the same slide 89 is also provided with a hardened steel insert 91'' but its inner end is imperforate or solid to form an abutment or limiting stop for the end of the staple wire $s$ as it is fed through the tubular guide 91, Figure 18.

That is, the guide members 91' and 91'' are arranged in transverse alinement in a plane just above but in close proximity to the upper face of the cam ring 48 so as to enable the staples to be applied to the folded plaits in a plane just above but close to the plait-folding levers 61 and 61', see Figures 3 and 18.

These guide members 91' and 91'' are also located in substantially the same horizontal plane as the front ends of the ribs 89' of the slide 89 so that when the slide is withdrawn to its extreme outermost position, as shown in Figure 18, the wire $s$ may be fed through the guide 91' and across the intervening space between the guide members 90 to abut endwise against the member 91'', Figure 18.

The inner ends of the wire-engaging members 91' and 91'' are substantially flush with the inner faces of the adjacent portions of the guide members 90 so that when the wire is fed across the inner ends of the ribs 89' and the slide 89 is moved inwardly the inner end of the rib adjacent the wire guide 91' will have a shearing coaction therewith to cut off the portion of the wire which is to form the staple, the inner ends of said ribs 89' being beveled inwardly toward each other to deflect and press the opposite ends of the severed staple portion inwardly as the slide 89 is moved inwardly toward the overlapping portions of the plaits, see Figures 3 and 18.

In order to effect the bending of the staple section of the wire by the inward movement of the slides 89 and 91 the intermediate portion of the staple must be held against inward movement and for this purpose is provided a holding pawl 93 pivoted at 93' to and between the opposite guide members 90 to extend inwardly from its pivot normally beyond the inner ends of the slides 89 and 91 when the latter are in their extreme outermost positions, as shown in Figures 3 and 18.

The inner end of each pawl 93 is provided with a groove 94 in its lower face adapted to engage the intermediate portion of the staple wire s' and to hold said intermediate portion against inward movement as the slides 89 and 91 are advanced toward the neck of the bottle for severing the staple section and bending the ends thereof toward the bottle preparatory to forcing the same through the overlapping portions of the plaits a'.

The inner lengthwise edges of the ribs 89' of the slide 89 are provided with lengthwise grooves 95 in the same horizontal plane as the wire staple section s' for receiving the opposite ends of the staple section and folding said ends into inwardly projecting parallel relation as indicated by dotted lines in Figure 18 as the slides 89 and 91 are moved inwardly relatively to the holding pawl 93.

The inner end of each of the slides 91 is normally disposed a distance outwardly from the inner ends of the ribs 89' corresponding approximately to the lengths of the opposite arms of the staple section s', the opposite lengthwise edges of said slide 91 being provided with ribs 96 engaging the grooves 95 to assist in guiding the slide 91 in its movement along and upon the slide 89, Figures 18, 19 and 20.

The object of this normal relation between the inner end of the slide 91 and corresponding ends of the ribs 89' is to utilize the slide 91 as an ejector for ejecting the staple after its ends have been bent into the grooves 95.

The slide 89 is provided with a boss 97 projecting through a slot 97' in the slide 91, Figures 1 and 3, said boss being normally engaged with the front end of the slot, which latter is somewhat longer than the corresponding length of the boss to allow a limited forward movement of the slide 91 after the staple has been forced into the overlapping portions of the plaits of the cap skirts and for finally clinching the inner ends of the staples against the neck of the bottle in a manner hereinafter described.

The wires from which the staples are formed are fed through their corresponding guides 91' to their staple severing and bending positions from suitable reels 99 which are journaled in brackets 99' on opposite sides of the vertically movable frame 7 with their upper sides in approximately the horizontal plane of the guides 91, see Figure 1.

The means for feeding the wire from each reel through its corresponding guide 91' comprises a pair of relatively short upright parallel shafts 100 and 100' journaled in a bracket 52 on the top of the frame 7, Figures 1, 2 and 4, and having their lower ends provided with cooperative feeding wheels 102 and 102', the upper ends of said shafts being connected by gears 103 for transmitting rotary motion from one to the other.

The periphery of the feeding wheel 102 is preferably smooth while the periphery of the companion wheel 102' is provided with an annular groove 104 for receiving the wire s and directing its inward movement to and through the corresponding guide member 91.

The operation of this wire feeding means is, of course, intermittent and in order that both wire feeding devices may be operated simultaneously and intermittingly the upper ends of the upright shafts 100 are connected by beveled gears 101 to opposite ends of a cross shaft 105, Figures 1, 2 and 3 and also Figure 15.

A sprocket wheel 106, Figure 15, is loosely mounted upon the shaft 105 and is provided with a crank arm 107 carrying at its outer end a pivoted pawl 108, said pawl being adapted to engage the teeth of a ratchet wheel 109 which is tight on the shaft 105 for rotating the same.

The sprocket wheel 106 is connected by a chain 110 to a companion sprocket wheel 111 on another cross shaft 112 which is also journaled in suitable bearings upon the bracket 52 of the frame 7 parallel with the shaft 109, Fig. 2.

The shaft 112 is provided intermediate its ends with a pinion 113 engaged by a vertically movable toothed rack 114 which is guided in a bracket 69 on the carriage 7, as shown in Figure 14, said rack having its lower end provided with a roller stud 116 engaged in a cam groove 117 in the upright cam wheel 72 previously mentioned, see Figures 2, 3 and 14.

This cam groove 117 is constructed and arranged to reciprocate the rack 114 vertically and thereby to rotate the shaft 112 in reverse directions. This reverse angular movement of the shaft 112 is transmitted to the sprocket wheel 106 for rotating the shaft 105 intermittingly in one direction to feed the staple wire into the machine while the reverse motion of the sprocket wheel 106 simply trails the pawl 108 around the teeth of the ratchet wheel 109 thereby leaving the shaft 105 at rest.

In other words, the pawl 108 and ratchet 109 constitute a one-way drive for the shaft 105 to cause the wire to be fed intermittingly in the same direction following each stapling operation.

Each wire feeding mechanism is operated intermittingly to feed the wire to the staple forming and applying-position while the staple forming and clinching slides 89 and 91 are in their extreme outermost positions but immediately following each wire feeding operation the slides 89 and 91 are moved forwardly or inwardly to form the staple and force it into the overlapping portions of the plaits of the cap skirt in the manner previously explained.

For this latter purpose the slide 89 is provided on its underside with a toothed rack 118, Figure 3, engaged with one of a pair of two pinions 119, one for each slide 89, said pinions being mounted upon a cross shaft 120 which is journaled in suitable bearings in the bracket 69, Figures 3 and 5.

The shaft 120 is provided with an intermediate pinion 121, Figures 5 and 14, meshing with a vertically movable toothed rack 122 which is also guided in the bracket 69 and has its lower end provided with a roller stud 123 engaging in a cam groove 124 in the cam wheel 72 previously mentioned.

The cam grooves 117 and 124 are constructed and timed to effect alternate movements of the wire feeding devices and staple applying devices in the manner previously described.

Suitable means is provided for tripping the staple holding pawl 93 as the slides 89 and 91 approach the limits of their inward movements and for this purpose the intermediate portion of the lower edge of each pawl is provided with a cam 115 adapted to be engaged by a projection 115' on the slide 91, Figure 3, as the two slides 89 and 91 are moved forwardly or inwardly to their staple applying positions at which time the shoulder 115' engages the cam 115 and thereby lifts the inner end of the pawl 93 out of engagement with the cross bar of the staple to allow the latter to be pressed home or through the overlapping portions of the plaits of the cap skirt by the inner end of the slide 91.
Each of the slides 91 is provided near its outer end with an upwardly projecting shoulder 130 adapted to be engaged by one of a pair of crank arms 131 on the shaft 112 so that immediately following the operation of the wire-feeding mechanism when the staple forming and applying devices are being actuated the return of the driving belt 110 in the direction indicated by arrow $y$, Figure 3, will cause the crank arms 131 to engage the shoulders 130 with a sudden impact to cause a correspondingly rapid inward movement of the slide 91 at the end of the inward stroke of the slide 89 to clinch the staple through the folded plaits and adjacent part of the skirt and against the bottle and thereby to firmly hold the cap upon and around the neck of the bottle.

As previously stated, the cam groove 82' is constructed and timed to effect the angular movements of the cam rings 48 through arcs substantially equal to the lengths of the eccentric cam grooves 60 and thereby to force the slides 59 to pressing positions and to cause said rings 47 to remain in their adjusted positions during the wire feeding and staple forming and applying operations.
Immediately following this first stapling operation the locking members 66, Figure 5, will be withdrawn from locking engagement with the rings 47 through the continued operation of the cam wheel 72 while the rings 48 will remain in their previously adjusted positions for holding the slides 59 in their pressing positions to keep the skirt of the cap firmly pressed against the neck of the bottle.

As soon as the ring 47 is released the continued rotation of the cam wheel 82 will effect a further rotation of both rings 47 and 48 together with bottles B and caps thereon one-third of a revolution to bring the next succeeding overlapping plaits of the cap into registration with the stapling slides 89 and 91, Figure 3, whereupon said stapling mechanism will be again operated for stapling the registering overlapping plaits.

Following this second stapling operation the cam 82 will effect further angular adjustment of the rings 47 and 48 together with the bottles B and caps thereon another third of a revolution to bring the third and last overlapping plaits of the cap into registration with the stapling slides 89 and 91 when the operation of the stapling mechanism will be repeated to effect the final securement of the caps to the bottles, it being understood that the bottle with the cap thereron is firmly held between their rotary supporting tables 14 and the rotary cap-retaining members 50 thus allowing the bottle with the cap thereon to be freely rotated during the operation of indexing the cap relatively to the stapling mechanisms for applying the three staples to the overlapping plaits of the bottle cap.
The continued rotation of the cam 82 will then restore the rings 47 and 48 and together with the bottles B with the caps thereon to their starting positions thus completing the cycle of operation of the machine at which time the bottles with the caps thereon are removed by hand or by any other suitable means.

Operation

Assuming that the bottle support 13 is in its extreme down position, as shown in Figure 3, and that the pressure slides 59 and stapling slides 89 and 91 are in their extreme outer positions, that the bottle with or without cap inserts in the mouths thereon are placed by hand upon the tables 14, the rotary parts of the machine being then in operation, the lowermost cap disks $a$ are fed from their respective magazines M between the bottle guide 44 and platen 50 of the plunger 51, Figure 3, until the centers of the disks are substantially coaxial with the mouths of the bottles B.

The bottle supports 13 are then raised to impinge the central portion of the cap between the top of the bottle and platen 50 and to force the cap upwardly through the rings 47 and 48 against the action of the spring 53 thereby forming the six plaits $a'$, as shown more clearly in Figure 24.

When the plaits are formed they are folded in pairs in overlapping relation by the inward movement of the slides 59 which firmly presses the folded plaits of each pair against the adjacent portions of the skirt of the cap and simultaneously presses the skirt against the neck of the bottle at which time the folded plaits of one pair will be registered with the stapling slides 89 and 91.

The wire $s$ is then fed across the inner ends of the stapling slide 91 as shown in Figure 18 whereupon both slides 89 and 91 of each stapling device are moved inwardly to sever the staple sections from the wires and to simultaneously bend the same in the form of a staple, the continued movement of the slides 89 and 91 serving to drive the staples through the registering overlapping plaits to clinch against the neck of the bottle.

The bottle with the cap thereon is then indexed angularly to successively register the remaining pairs of folded plaits with the stapling slides whereupon the feeding of the wire $s$ across the inner end of the stapling slides and the inward operation of the slides is repeated until each pair of overlapping plaits are firmly stapled together and clinched against the neck of the bottle.
The capped bottles are then returned angularly to their starting positions for removal from their respective supports 13, it being understood that previous to this return, the bottle supports 13 and also the slides 59, 89 and 91 will have been returned to their starting positions by their respective cams which are arranged and timed to effect the operations described in proper order.

What I claim is:
1. In a machine for forming skirted bottle caps and applying them to the mouths and necks of the bottles, a bottle supporting element, a cap-forming element adapted to receive the top of the bottle with the cap blank thereon, means for feeding a cap blank across the mouth of the bottle when resting upon its supporting element, means for effecting a relative movement of said elements toward each other to cause the top of the bottle with the cap thereon to enter the forming element, means for forcing the marginal edges of the cap blank around the neck of the bottle as the top of the bottle enters the forming element to form the skirt of the cap, additional means for folding portions of the skirt into overlapping positions, and means for stapling the overlapping portions of the skirt to each other.

2. In a bottle-capping machine in which the cap blanks are of sufficient area to skirt the head and neck of the bottle when applied thereto, a die adapted to receive the head of the bottle, means for placing a cap blank between and substantially co-axial with the die and head of bottle, means for effecting relative endwise movement of the die and bottle toward each other to cause the head of the bottle and central portion of the cap blank to enter the die, said die having means for bending the marginal portions of the cap blank around the head and neck of the bottle to form a skirt and for plaiting said skirt as the head enters the die, and means for folding selected pairs of plaits into overlapping relation.

3. In a bottle-capping machine in which the cap blanks are of sufficient area to skirt the head and neck of the bottle when applied thereto, a die adapted to receive the head of the bottle, means for placing a cap blank between and substantially co-axial with the die and head of the bottle, means for effecting relative endwise movement of the die and bottle toward each other to cause the head of the bottle and central portion of the cap blank to enter the die, said die having means for bending the marginal portions of the cap blank around the head and neck of the bottle to form a skirt and for plaiting said skirt as the head enters the die, means for folding selected pairs of plaits into overlapping relation, and additional means for fastening the overlapping plaits to each other.

4. In a bottle-capping machine in which the cap blanks are of sufficient area to skirt the head and neck of the bottle when applied thereto, a die adapted to receive the head of the bottle, means for placing a cap blank between and substantially co-axial with the die and head of the bottle, means for effecting relative endwise movement of the die and bottle toward each other to cause the head of the bottle and central portion of the cap blank to enter the die, said die having means for bending the marginal portions of the cap blank around the head and neck of the bottle to form a skirt and for plaiting said skirt as the head enters the die, means for folding the plaits circumferentially against adjacent portions of the skirt, and means for securing said plaits in their folded positions to said skirt.

5. In a bottle capping machine in which the cap-blanks are of sufficient area to skirt the head and neck of the bottle when applied thereto, a die having an opening of sufficient size to receive the head of the bottle, means for placing a cap-blank between the die and head of the bottle substantially coaxial therewith, and means for effecting relative endwise movement of the die and bottle to cause the head of the bottle and central portion of the blank to enter the opening in the die, said die having a series of beveled slots extending outwardly from the opening for folding adjacent portions of the cap skirt into plaits during said relative movement of the die and bottle.

6. In a bottle-capping machine in which the cap blanks are of sufficient area to skirt the head and neck of the bottle when applied thereto, a die having an opening of sufficient size to receive the head of the bottle, means for placing a cap blank between the die and head of the bottle substantially co-axial therewith, means for effecting relative endwise movement of the die and bottle to cause the head of the bottle and central portion of the blank to enter the opening in the die, said die having a series of slots extending outwardly from the opening for folding adjacent portions of the cap skirt into plaits during said relative movement of the die, means for folding the plaits against adjacent portions of the skirt, and additional means for stapling the folded plaits to said adjacent portions of the skirt.

7. In a bottle capping machine in which the cap-blanks are of sufficient area to skirt the head and neck of the bottle when applied thereto, a die element having an opening and beveled slots extending outwardly from the opening, a bottle-supporting element for holding the head of the bottle in alinement with the opening in the die, means for placing a cap-blank between the die and head of the bottle in axial alinement therewith, and means for effecting a relative endwise movement of said elements toward each other to cause the head of the bottle and cap blank to enter the opening and slots and thereby to form and plait the cap-skirt in one operation.

8. In a bottle-capping machine in which the cap blanks are of sufficient area to skirt the head and neck of the bottle when applied thereto, a die element having an opening and slots extending outwardly from the opening, a bottle-supporting element for holding the head of the bottle in alignment with the opening in the die, means for placing a cap blank between the die and head of the bottle in axial alignment therewith, means for effecting a relative endwise movement of said elements toward each other to cause the head of the bottle and cap blank to enter the opening and slots and thereby to form and plait the cap skirt in one operation, means for folding the plaits in pairs one upon the other, and additional means for securing the overlapping plaits to each other.

9. A bottle-capping machine as in claim 7 in which means is provided for holding the central portion of the cap blank flatwise against the mouth of the bottle during the skirt forming and plaiting operations.

10. In a machine of the class described, mechanism for placing a paper disk over the mouth of a bottle with the edge portion of the disk extending outwardly from the bottle, mechanism for folding the projecting portion of the disk into a plurality of substantially radial plaits surrounding the neck of the bottle and additional mechanism for stapling the plaits to the body of the disk.

11. In a machine for forming and applying a coverall cap to a bottle having a mouth and a reduced neck portion below the mouth, mechanism for folding the edge of a paper disk over the mouth and about the neck of a bottle with the excess portion of the edge of the disk not required to surround the neck of the bottle formed into a plurality of spaced plaits folded against the body of the disk, and additional mechanism for stapling the plaits to the body of the disk.

12. In a machine of the class described, mechanism for placing a paper disk over the mouth of the bottle with the edge portion of the disk extending outwardly from the bottom, mechanism for folding the projecting portion of the disk into a plurality of plaits surrounding the neck of the bottle, a stapling mechanism for stapling the plaits to the body of the disk positioned at one side of the folding mechanism, and means for producing intermittent relative rotary movement of the bottle and stapling mechanism to bring the plaits into successive engagement with said stapling mechanism.

13. In a bottle capping mechanism in which the cap blanks are of sufficient area to skirt the head and neck of the bottle when applied thereto, a die element having an opening and beveled plait forming slots arranged in pairs and to extend outwardly from the opening, the slots of each pair being beveled in opposite directions for deflecting the plaits of each pair away from each other, bottle supporting means for causing the head of a bottle with a cap blank thereon to enter the opening and slots and thereby to form and plait the cap skirt in one operation, and plait-folding means adapted to fold the plaits of each pair in opposite directions to overlapping relation with plaits of adjacent pairs.

14. In a bottle capping machine in which the cap blanks are of sufficient area to skirt the head and neck of the bottle when applied thereto, a die element having an opening and beveled slots extending outwardly from the opening, bottle-supporting means for causing the head of a bottle with a cap blank thereon to enter the opening and slots and thereby to form and plait the cap skirt in one operation, plait folding levers arranged in pairs, said levers being pivoted intermediate their ends and mounted for movement toward and from said opening, the levers of each pair having their adjacent ends normally extending forward of the pivots to engage and maintain the cap skirt in contact with the bottle and means for moving the levers to bring their opposite ends into engagement with corresponding plaits to effect the folding thereof.

15. In a bottle-capping machine, a cap-forming die adapted to form the central portion of a cap blank over the head of a bottle and to fold the remaining portion of the blank about the neck of the bottle, and stapling means adapted to secure the folded portions of the blank in position.

16. In a bottle-capping machine, a cap-forming die adapted to form the central portion of a cap blank over the head of a bottle and to fold the remaining portion of the blank in plaits about the neck of the bottle, and stapling means adapted to secure the plaits in their folded positions.

17. In a bottle-capping machine, a cap-forming die adapted to form the central portion of a cap blank over the head of a bottle and to fold the remaining portion of the blank in plaits about the neck of the bottle, means for holding the central portion of the cap blank flatwise against the mouth of the bottle during the cap-forming and plaiting operation, and stapling means adapted to secure the plaits in their folded positions.

18. In a bottle-capping machine, a cap-forming die adapted to form the central portion of a cap blank over the head of a bottle and to fold the remaining portion of the blank in plaits about the neck of the bottle, a stapling mechanism for stapling plaits to the body of the cap blank, and means for producing relative rotary movement of the cap and stapling mechanism to bring the plaits into successive engagement with said stapling mechanism.

19. In a bottle-capping machine, a cap-forming die adapted to form the central portion of a cap blank over the head of a bottle and to fold the remaining portion of the blank in plaits about the neck of the bottle, a stapling mechanism for stapling plaits to the body of the cap blank, means for producing relative rotary movement of the cap and stapling mechanism to bring the plaits into successive engagement with said stapling mechanism, and rotary means for holding the central portion of the cap blank flatwise against the mouth of the bottle during the cap-forming and plaiting operation.

20. In a bottle-capping machine, a die element having an opening therethrough for receiving the head of a bottle and a series of slots extending outwardly from said opening for folding adjacent portions of the cap skirt into plaits, means for folding said plaits against the adjacent portion of the skirt, and means for stapling the plaits in the folded position.

21. In a bottle-capping machine in which the cap blanks are of sufficient area to skirt the head and neck of the bottle when applied thereto, a die element having an opening and beveled slots extending outwardly from the opening, a bottle-supporting element for holding the head of the bottle in alignment with the opening in the die, means for placing a cap blank between the die and head of the bottle in axial alignment therewith, means for effecting a relative endwise movement of said elements towards each other to cause the head of the bottle and cap blank to enter the opening and slots and thereby to form and plait the cap skirt in one operation, and means for pressing the skirt and plaits around the bottle neck.

22. In a bottle-capping machine in which the cap blanks are of sufficient area to skirt the head and neck of the bottle when applied thereto, a die element having an opening and beveled slots extending outwardly from the opening, a bottle-supporting element for holding the head of the bottle in alignment with the opening in the die, means for placing a cap blank between the die and head of the bottle in axial alignment therewith, means for effecting a relative endwise movement of said elements towards each other to cause the head of the bottle and cap blank to enter the opening and slots and thereby to form and plait the cap skirt in one operation, means for pressing the skirt and plaits around the bottle neck, and mechanism for positioning a securing means to maintain the plaits in the folded position against the skirt.

23. In a bottle capping machine in which the cap blanks are of sufficient area to skirt the head and neck of the bottle when applied hereto, a cap-forming and plaiting mechanism adapted to receive the head of the bottle therein, means for effecting relative endwise movement of the bottle with the cap blank positioned over the head thereof and said mechanism for plaiting the skirt of said cap, and means for folding the plaits circumferentially upon the adjacent portion of the skirt at the end of said relative movement.

24. In a bottle capping machine in which the cap blanks are of sufficient area to skirt the head and neck of the bottle when applied thereto, a cap-forming and plaiting mechanism adapted to receive the head of the bottle therein, means for effecting relative endwise movement of the bottle with the cap blank positioned over the head thereof and said mechanism for plaiting the skirt of said cap, folding means reciprocably movable toward and from the bottle for wrapping the plaits circumferentially against adjacent portions of the skirt, and means for actuating said folding means at the end of said relative movement.

25. In a bottle capping machine in which the cap blanks are of sufficient area to skirt the head and neck of the bottle when applied thereto, a cap-forming and plaiting mechanism adapted to receive the head of the bottle therein, means for effecting relative endwise movement of the bottle with the cap blank positioned over the head thereof and said mechanism for plaiting the skirt of said cap, a plurality of reciprocating slides movable toward and from the bottle, means pivotally secured to said slides adapted to wrap the plaits circumferentially against adjacent portions of the skirt when the slides are in their innermost position, and means for actuating said slides.

26. In a bottle capping machine in which the cap blanks are of sufficient area to skirt the head and neck of the bottle when applied thereto, a cap-forming and plaiting mechanism adapted to receive the head of the bottle therein, means for effecting relative endwise movement of the bottle with the cap blank positioned over the head thereof and said mechanism for plaiting the skirt of said cap, reciprocating slides movable toward and from the bottle, means pivotally secured to said slides adapted to wrap the plaits circumferentially against adjacent portions of the skirt when the slides are in their innermost position, and means for actuating said slides at the end of said relative movement.

27. In a bottle capping machine in which the cap blanks are of sufficient area to skirt the head and neck of the bottle when applied thereto, a cap-forming and plaiting mechanism adapted to receive the head of the bottle therein, said mechanism having means for bending the marginal portions of the cap blank around the head and neck of the bottle to form a skirt and to fold excess portions of the skirt into a plurality of substantially radial plaits, means for effecting relative endwise movement of a bottle with a cap blank positioned over the head thereof and said mechanism for plaiting the skirt of the cap, and means for folding selected pairs of plaits toward each other against the body of the skirt at the end of said relative movement.

28. In a bottle capping machine in which the cap blanks are of sufficient area to skirt the head and neck of the bottle when applied thereto, a cap-forming and plaiting mechanism adapted to receive the head of the bottle therein, said mechanism having means for bending the marginal portions of the cap blank around the head and neck of the bottle to form a skirt and to fold excess portions of the skirt into a plurality of substantially radial plaits, means for effecting relative endwise movement of a bottle with a cap blank positioned over the head thereof and said mechanism for plaiting the skirt of the cap, means for folding selected pairs of plaits toward each other against the body of the skirt at the end of said relative movement, and means for fastening the plaits in respective pairs to the skirt.

29. A bottle capping machine comprising in combination means for applying the central portion of a cap blank to the mouth of the bottle and for wrapping the marginal portion of the blank in contracted form about the neck of the bottle, and a stapling mechanism adapted to secure the wrapped portions of the cap in the contracted position.

30. A bottle capping machine comprising in combination means for applying the central portion of a cap blank to the mouth of the bottle, positively actuated means for wrapping the marginal portion of the blank in contracted form about the neck of the bottle, and a stapling mechanism adapted to secure the wrapped portions of the cap in the contracted position.

31. A bottle capping machine comprising in combination means for applying the central portion of a cap blank to the mouth of the bottle and for wrapping the marginal portion of the blank in contracted form about the neck of the bottle, a stapling mechanism, means for operating said stapling mechanism, and means for producing relative movement of the cap and stapling mechanism whereby the staples will be applied to the cap at two or more places for securing the wrapped portion of the cap in the contracted position.

32. In a machine for applying a cover-all cap to a bottle having a mouth and a reduced neck portion below the mouth, means for applying the central portion of a cap blank to the mouth of the bottle and for wrapping the marginal portion of the blank about the neck of the bottle with portions thereof lying in overlapping relation, and stapling means for securing overlapping portions of the blank to each other.

33. In a machine for applying a cover-all cap to a bottle having a mouth and an outwardly extending shoulder contiguous said mouth, means for applying the central portion of a cap blank to the mouth of the bottle, mechanism for bending the marginal portion of the blank downwardly over the shoulder to form a skirt, means for contracting the skirt beneath said shoulder with portions of said skirt lying in overlapping relation, and means for stapling overlapping portions of the skirt to each other.

34. A bottle capping machine comprising in combination a bottle-supporting element, a cap-forming element adapted to receive the mouth of the bottle with the cap blank thereon, means for effecting a relative movement of said elements toward each other to cause the head of the bottle with the cap blank thereon to enter the forming element to form the skirt of the cap, additional means for wrapping portions of the skirt into overlapping positions about the neck of the bottle, and means for stapling overlapping portions of the skirt to each other.

35. In a machine for applying a cover-all cap to a bottle having a mouth and an outwardly extending shoulder contiguous said mouth, means for applying the central portion of a cap blank to the mouth of the bottle, mechanism for bending the marginal portion of the blank downwardly over the shoulder to form a skirt, means comprising positively actuated elements for contracting the skirt beneath said shoulder with portions of said skirt positioned in overlapping relation with other portions thereof, and means for stapling overlapping portions of the skirt to each other.

36. In a bottle capping machine in which the cap blanks are of sufficient area to skirt the head and neck of the bottle when applied thereto, a cap-forming mechanism comprising a plate having a die opening therein with walls for simultaneously forming and bending a skirted cap over the mouth and about the neck of the bottle, means for producing relative movement of the bottle and cap-forming mechanism toward each other to bring the bottle and the cap blank mounted thereon into operative engagement with said plate, additional means for wrapping the marginal portion of the blank around the neck of the bottle with portions thereof in overlapping relation with other portions, and means for stapling overlapping portions of the skirt together.

37. In a bottle capping machine in which the cap blanks are of sufficient area to skirt the head and neck of the bottle when applied thereto, a cap-forming mechanism comprising a plate having a die opening therein with walls for simultaneously forming and bending a skirted cap over the mouth and about the neck of the bottle, means for producing relative movement of the bottle and cap-forming mechanism toward each other to bring the bottle and the cap blank mounted thereon into operative engagement with said plate, additional means comprising horizontally reciprocating plungers for wrapping the marginal portion of the blank around the neck of the bottle with portions thereof in overlapping relation with other portions, and means for stapling overlapping portions of the skirt together.

38. In a bottle capping machine in which the cap blanks are of sufficient area to skirt the head and neck of the bottle when applied thereto, a cap-forming and plaiting means adapted to receive the head of the bottle with the cap blank thereon, operative means adapted to effect the relative movement of the bottle and cap-forming means toward each other to fold the central portion of the blank over the head of the bottle and to plait the remaining portion of the blank, and a horizontal reciprocating means for folding the plaits around the neck of the bottle.

39. In a bottle capping machine in which the cap blanks are of sufficient area to skirt the head and neck of the bottle when applied thereto, a cap-forming and plaiting means adapted to receive the head of the bottle with the cap blank thereon, operative means adapted to effect the relative movement of the bottle and cap-forming means toward each other to fold the central portion of the blank over the head of the bottle and to plait the remaining portions of the blank, means comprising horizontally reciprocating plungers for folding adjacent plaits circumferentially toward each other upon adjacent portions of the skirt, and means for stapling the folded plaits and skirt together.

ALEXANDER MELDRUM.